Figure 1:
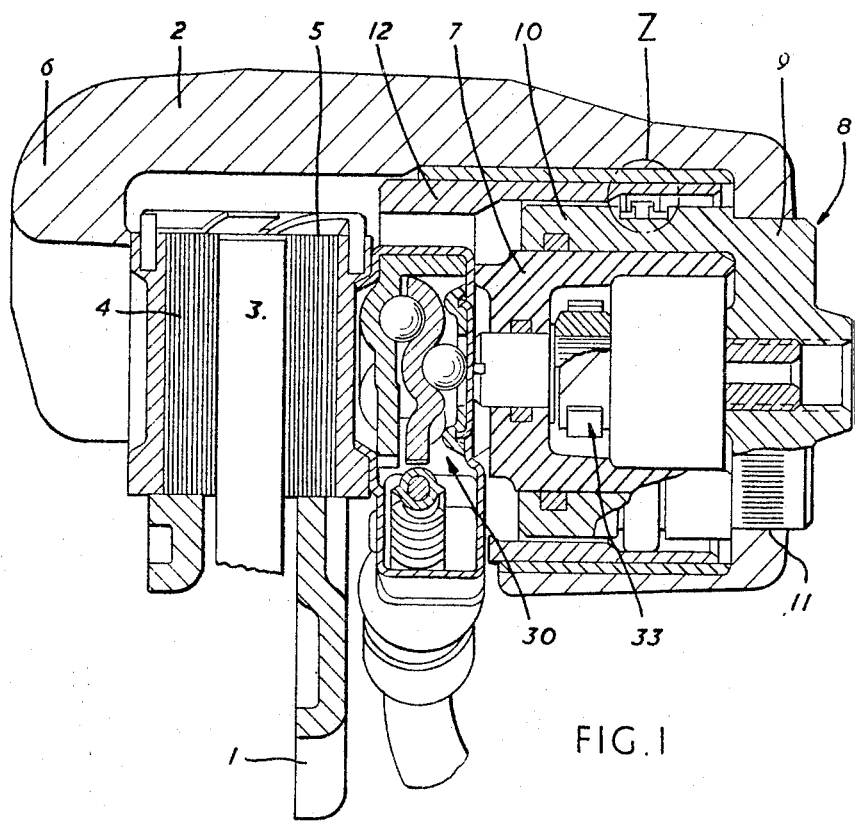

United States Patent Office 3,269,491
Patented August 30, 1966

3,269,491
WEAR ADJUSTING MEANS FOR A SPOT TYPE DISC BRAKE
Juan Belart, Walldorf, Fritz Ostwald, Buchschlag, and Karl Schlör, Biebesheim, Germany, assignors to Dunlop Rubber Company Limited, London, England, a corporation of Great Britain
Filed Mar. 1, 1965, Ser. No. 435,789
6 Claims. (Cl. 188—73)

This invention relates to disc brakes, and to retraction and centralising devices for disc brakes.

According to the invention a disc brake comprises a rotatable disc and a caliper non-rotatably and axially slidably mounted on a fixed support with a pair of limbs straddling a periphery of the disc, the caliper having a friction element fixed to one limb on one side of the disc and a friction element axially movable relative to the caliper and into engagement with the opposite side of the disc, a brake-applying mechanism arranged to effect axial movement of the movable friction element, and a retraction and centralising device comprising a friction member which is axially slidable in frictional engagement with the fixed support, a stop member on the caliper, and resilient means associated with the caliper and the friction member to urge the caliper towards a position in which the stop member contacts the friction member, whereby the resilient means acts to move the caliper to retract the friction element fixed thereto to a predetermined distance from the disc following a brake application.

According to the invention also a disc brake comprises a rotatable disc and a pair of friction elements supported so as to be axially movable into engagement with opposite sides of the disc, means for moving the friction elements into engagement with the disc comprising a pair of relatively axially movable members, and a retraction and centralising device comprising a ring of U-shaped cross-section having radial flanges and being axially slidably mounted in frictional engagement with one of the members, a pair of rings of L-shaped cross-section mounted between fixed abutments on the other members, the rings of L-shaped cross-section each having a radial flange located between the flanges of the ring of U-shaped cross-section and an axially extending portion for engagement with its associated abutment, resilient means being provided for urging the rings of L-shaped cross-section axially away from one another and into engagement with the respective flanges of the ring of U-shaped cross-section, the axial thickness of each of the flanges of the ring of U-shaped cross-section being less than the axial length of the axially extending portion of the corresponding ring of L-shaped cross-section by an amount equal to half of the desired free play in the brake, and the abutments each being engageable with the corresponding flange of the ring of U-shaped cross-section whenever the free play in the brake exceeds the desired amount to move the ring of U-shaped cross-section to a new position.

Preferably, the disc brake according to the invention comprises a rotatable disc and a pair of friction elements supported so as to be axially movable into engagement with opposite sides of the disc, means for moving the friction elements into engagement with the disc comprising a pair of relatively axially movable members, and a retraction and centralising device comprising a ring of U-shaped cross-section having radial flanges and being axially slidably mounted in frictional engagement with one of the members, a pair of rings of L-shaped cross-section mounted between fixed abutments on the other member, the rings of L-shaped cross-section each having a radial flange located between the flanges of the ring of U-shaped cross-section and an axially extending portion for engagement with its associated abutment, resilient means being provided for urging the rings of L-shaped cross-section axially away from one another and into engagement with the respective flanges of the ring of U-shaped cross-section, the axial thickness of each of the flanges of the ring of U-shaped cross-section being less than the axial length of the axially extending portion of the corresponding ring of L-shaped cross-section by an amount equal to half of the desired free play in the brake, and the abutments each being engageable with the corresponding flange of the ring of U-shaped cross-section whenever the free play in the brake exceeds the desired amount to move the ring of U-shaped cross-section to a new position.

Figure 2:
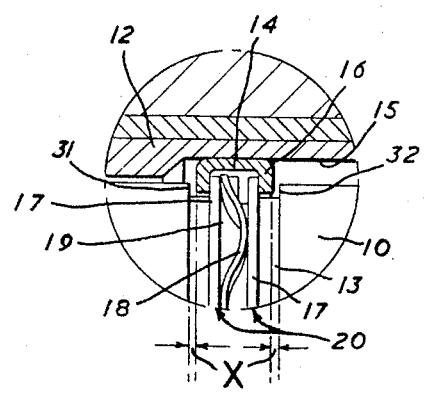

One embodiment of the invention will now be described by way of example with reference to the accompanying drawings, in which:

FIGURE 1 is an axial cross-sectional view of a disc brake according to the invention with the brake applied, and FIGURE 2 is an enlarged view of the portion "Z" of FIGURE 1.

The disc brake comprises a brake support 1 which is fastened to a non-rotatable component of an associated vehicle axle, a caliper 2 which straddles the outer periphery of a braking disc 3 and a pair of friction pads 4 and 5. The friction pad 4 is secured to one limb 6 of the caliper 2 and the friction pad 5 is axially movable relative to the caliper by a piston 7 contained in a hydraulic cylinder 8. A mechanically-operated brake-applying mechanism 30 of the "ball-and-ramp" kind is also provided between the piston 7 and the friction pad 5, but this is not a significant feature of the present invention and will not therefore be described in detail.

The hydraulic cylinder 8 comprises a portion 10 which is axially movable within a guide sleeve 12 fixed to the brake support 1 and a reduced-diameter portion 9 which fits into a bore 11 in the caliper 2. The caliper 2 is axially slidable on a rubber bush carried on the outer surface of the guide sleeve 12, so that when the brake is operated the reaction on the cylinder 8 generated when the friction pad 5 is pressed against the disc 3 will move the caliper to the right as seen in FIGURE 1, thereby drawing the friction pad 4 into engagement with the disc.

A retraction and centralising device "Z" is provided to withdraw the friction pad 4 to a predetermined distance from the disc after each operation of the brake. The device "Z" comprises a friction member in the form of a resilient split ring 14 of U-shaped cross-section which is loosely held in a groove 19 in the outer surface of the cylinder 8 and is compressed to fit within the guide sleeve 12. The ring 14 is axially slidable within the guide sleeve, but this sliding movement is resisted by the friction set up between the outer surface of the ring 14 and the inner wall 15 of the sleeve 12. The ring 14 has inwardly extending radial flanges 16, and two rings 20 of L-shaped cross-section are fitted in the groove 19 with their radial flanges 17 located between the flanges 16 of the ring 14 to constitute stop members. An annular corrugated spring 18 is positioned between the rings 20, the spring 18 tending to move the rings 20 axially away from one another and into engagement with the respective flanges of the ring of U-shaped cross-section. The dimensions of the rings 14 and 20 and of the groove 19 are such that the shoulders 31 and 32 of the groove 19 constitute abutments which are engaged respectively by the ends of the axially extending portions of the rings 20 and which can also engage the flanges 16 of the ring 14 when the axial movement of the cylinder 8 in either direction exceeds a distance "x."

The piston 7 is provided with a retraction spring (not shown) together with an adjustment device 33 which is not shown in detail, the effect of which is to ensure that the friction pads 4 and 5 are moved apart through a predetermined distance after each hydraulically-effected application of the brake. This retraction mechanism however does not necessarily retract the pads 4 and 5 to equal distances from the disc, and this function is carried out by the retraction and centralising device 17.

In operation, when the brake is hydraulically operated the cylinder 8 and caliper 2 are moved to the right as seen in FIGURE 1. The shoulder 31 of the groove 19 engages the axially extending portion of the associated ring 20 and moves the ring 20 to the right, compressing the spring 18 against the other ring 20 which is retained in a fixed axial position by the ring 14. If the friction pad 4 wears sufficiently to cause the cylinder 8 to move through an axial distance greater than "x," the shoulder 31 engages the ring 14 to move it to a new axial position.

On release of the brake the compressed spring 18 pushes back the cylinder, and hence the caliper 2 and friction pad 4, through the distance "x" thus re-establishing the desired clearance between the pad 4 and the disc 3. The friction pad 5 is simultaneously moved back by the piston retraction spring or by suitable spring means arranged to separate the pads to a distance which provides an equal clearance "x" between the pad 5 and the disc 3.

The retraction and centralising device "Z" has a further function in that if the disc 3 is deflected in either direction and engages one of the friction pads while the brake is not in operation, the resulting movement of the caliper moves the appropriate ring 20 to compress the spring 18 which then restores the caliper to its central position when the deflection of the disc ceases.

Having now described our invention, what we claim is:

1. A disc brake comprising a rotatable disc and a caliper non-rotatably and axially slidably mounted on a fixed support with a pair of limbs straddling a periphery of the disc, the caliper having a friction element fixed to one limb on one side of the disc and a friction element axially movable relative to the caliper and into engagement with the opposite side of the disc, a brake-applying mechanism arranged to effect axial movement of the movable friction element, and a retraction and centralising device comprising a friction member which is axially slidable in frictional engagement with the fixed support, a stop member on the caliper, and non-planar deformable resilient means associated with the caliper and the friction member to urge the caliper towards a position in which the stop member contacts the friction member, whereby the resilient means acts to move the caliper to retract the friction element fixed thereto to a predetermined distance from the disc following a brake application.

2. A disc brake comprising a rotatable disc and a pair of friction elements supported so as to be axially movable into engagement with opposite sides of the disc, means for moving the fraction elements into engagement with the disc comprising a pair of relatively axially movable members, and a retraction and centralising device comprising a ring of U-shaped cross-section having radial flanges and being axially slidably mounted in frictional engagement with one of the members, a pair of rings of L-shaped cross-section mounted between fixed abutments on the other members, the rings of L-shaped cross-section each having a radial flange located between the flanges of the ring of U-shaped cross-section and an axially extending portion for engagement with its associated abutment, resilient means being provided for urging the rings of L-shaped cross-section axially away from one another and into engagement with the respective flanges of the ring of U-shaped cross-section, the axial thickness of each of the flanges of the ring of U-shaped cross-section being less than the axial length of the axially extending portion of the corresponding ring of L-shaped cross-section by an amount equal to half of the desired free play in the brake, and the abutments each being engageable with the corresponding flange of the ring of U-shaped cross-section whenever the free play in the brake exceeds the desired amount to move the ring of U-shaped cross-section to a new position.

3. A disc brake comprising a rotatable disc and a non-rotatable caliper straddling a minor portion of a periphery of the disc and axially slidably mounted on a fixed member, the caliper having a friction element fixed thereto for engagement with one side of the disc and a friction element on the opposite side of the disc which is axially movable towards the disc by a piston and cylinder mechanism associated with the caliper, the fixed member having a cylindrical guide sleeve on the external surface of which the caliper is slidable, the piston and cylinder mechanism being axially movable within the sleeve, a retraction and centralising device being provided which comprises a ring of U-shaped cross-section having inwardly-extending radial flanges and being axially slidably mounted within the guide sleeve in frictional engagement therewith, a pair of rings of L-shaped cross-section mounted between fixed abutments on the piston and cylinder mechanism, the rings of L-shaped cross-section each having a radial flange located between the flanges of the ring of U-shaped cross-section and an axially extending portion for engagement with its associated abutment, and resilient means being provided for urging the rings of L-shaped cross-section axially away from one another and into engagement with the respective flanges of the ring of U-shaped cross-section, the axial thickness of each of the flanges of the ring of U-shaped cross-section being less than the axial length of the cylindrical portion of the corresponding ring of L-shaped cross-section by an amount equal to half the desired free play in the brake, and the abutments each being engageable with the corresponding flange of the ring of U-shaped cross-section whenever the free play in the brake exceeds the desired amount, to move the ring of U-shaped cross-section to a new position.

4. A disc brake according to claim 3 wherein the rings of L-shaped cross-section are located in a groove in the outer wall of the cylinder of the piston and cylinder mechanism.

5. A disc brake according to claim 3 wherein the resilient means comprises an annular corrugated spring located between the rings of L-shaped cross-section.

6. A disc brake according to claim 3 wherein the ring of U-shaped cross-section is a resilient split ring arranged to fit in compression within the bore of the cylindrical guide sleeve.

References Cited by the Examiner
UNITED STATES PATENTS 3,182,754   5/1965   Hahm et al. _____ 188—73
3,186,521   6/1965   Chouings _____ 188—72

MILTON BUCHLER, Primary Examiner.

G. E. A. HALVOSA, Assistant Examiner.